(12) United States Patent
Pankaj et al.

(10) Patent No.: US 10,926,886 B2
(45) Date of Patent: Feb. 23, 2021

(54) FUEL TANK INERTING

(71) Applicant: Eaton Intelligent Power Limited, Dublin (IE)

(72) Inventors: Shireesh Pankaj, Pune (IN); Mahesh Prabhakar Joshi, Pune (IN); Swarnim Gupta, Pune (IN); Alan Ernest Massey, Southampton Hampshire (GB)

(73) Assignee: Eaton Intelligent Power Limited, Dublin (IE)

( * ) Notice: Subject to any disclaimer, the term of this patent is extended or adjusted under 35 U.S.C. 154(b) by 277 days.

(21) Appl. No.: 15/774,111

(22) PCT Filed: Nov. 7, 2016

(86) PCT No.: PCT/EP2016/076791
§ 371 (c)(1),
(2) Date: May 7, 2018

(87) PCT Pub. No.: WO2017/077100
PCT Pub. Date: May 11, 2017

(65) Prior Publication Data
US 2018/0327107 A1    Nov. 15, 2018

(30) Foreign Application Priority Data

Nov. 7, 2015  (IN) ........................... 3644/DEL/2015
Dec. 21, 2015  (GB) ..................................... 1522523

(51) Int. Cl.
*B64D 37/32*    (2006.01)
*H02K 44/02*    (2006.01)
(Continued)

(52) U.S. Cl.
CPC ............. *B64D 37/32* (2013.01); *H02K 44/02* (2013.01); *A62C 3/08* (2013.01); *B64D 37/02* (2013.01); *Y02T 50/40* (2013.01)

(58) Field of Classification Search
None
See application file for complete search history.

(56) References Cited

U.S. PATENT DOCUMENTS 3,584,976 A   6/1971  Schuster
2015/0333347 A1* 11/2015 Brunaux ........... H01M 8/04089
                                        429/446

FOREIGN PATENT DOCUMENTS

DE    102004046500 A1   4/2006
SU       1286285 A2    1/1987
WO    2013140312 A2    9/2013

OTHER PUBLICATIONS

Translation of DE102004046500, accessed Apr. 3, 2020 (Year: 2006).*

(Continued)

*Primary Examiner* — Christopher P Jones
*Assistant Examiner* — Phillip Y Shao
(74) *Attorney, Agent, or Firm* — Fishman Stewart PLLC (57) ABSTRACT

An aircraft fuel tank inerting system is disclosed. An aircraft fuel tank inerting system may include a paramagnetic pump arranged to apply a magnetic field to a source of gas to provide a motivational force for removing oxygen from said gas. A paramagnetic pump may include a series of magnetic field generating elements configured to provide a sequence of discrete spaced apart magnetic fields. The series of magnetic field generating elements may include a series of spaced apart pairs of magnetic field generating elements. Each spaced apart pair of magnetic field generating elements may be arranged to generate a respective spaced apart magnetic field, of the sequence of discrete spaced apart magnetic fields, across an airspace therebetween.

15 Claims, 7 Drawing Sheets

(51) Int. Cl.
*A62C 3/08* (2006.01)
*B64D 37/02* (2006.01)

(56) References Cited

OTHER PUBLICATIONS

Translation of SU1286285A2, accessed May 15, 2020 (Year: 1987).*
International Search Report, PCT/EP2016/076791, dated Feb. 1, 2017.

* cited by examiner

FUEL TANK INERTING

CROSS-REFERENCE TO RELATED APPLICATION

This application is a National Stage Patent Application of International Patent Application No. PCT/EP2016/076791, filed Nov. 7, 2016, which claims the benefit of Indian Application Serial No. 3644/DEL/2015, filed Nov. 7, 2015, and Great Britain Application Serial No. 1522523.8, filed Dec. 21, 2015, the contents of each are incorporated by reference in their entireties.

TECHNICAL FIELD

This invention relates to aircraft fuel tank inerting systems and air separation modules for use in such systems.

BACKGROUND

Aircraft fuel tanks are now subject to fuel tank flammability requirements (FAR25.981b). As a result, a common approach to meeting this requirement is to provide an "inerting system" which is effective in reducing the flammable gas within the ullage space which exists above the fuel within each fuel tank. For example, inerting systems may comprise a system in which Nitrogen Enriched Air (NEA) is generated by an On Board Inert Gas Generating System (OBIGGS) which is then pumped into the fuel tanks. Such systems generally utilise an Air Separation Module which generates NEA by passing air (for example bleed air) through a hollow-fibre permeable membrane.

It will be appreciated that the provision of any inerting system carries a direct weight and/or space penalty for the aircraft (which may result in decreased range and/or fuel efficiency). Accordingly, there is an ongoing desire to provide improved or alternate inerting systems.

SUMMARY

Accordingly, in one aspect, this invention provides an aircraft fuel tank inerting system, comprising a paramagnetic pump arranged, in use, to apply a magnetic field to the source of gas. The paramagnetic pump provides a motive force for removing oxygen from said gas.

Oxygen is a paramagnetic substance which is drawn towards areas of higher magnetic field strength. In contrast nitrogen, carbon dioxide and most hydrocarbon fuels are repelled by stronger magnetic fields. Thus, the applicants have recognised that this effect may be utilised to provide a selective motive force to oxygen in a fuel tank inerting system. By a selective motive force it will be understood that the embodiments of the invention seek to apply a motive force selectively to oxygen molecules in the gas of a fuel system but not to other components of the gas such as nitrogen or hydrocarbons (such as fuel vapours).

The paramagnetic pump may comprise a series of magnetic field generating elements. The magnetic field generating elements may be configured in use, to provide a sequence of discreet, spaced apart, magnetic fields. The magnetic field generating elements may for example be permanent magnets. Alternatively the magnetic field generating elements may be electromagnetic elements. By providing a sequence of spaced apart magnetic fields, the paramagnetic pump of the invention may provide a space between adjacent magnetic fields. Thus, oxygen may be attracted into regions where the magnetic field is strongest whilst nitrogen and/or hydrocarbons and the like may be separated into the spaces between the magnetic fields.

The magnetic field generating elements may be arranged in spaced apart pairs. Accordingly the magnetic field generating element may comprise a series of spaced apart pairs. An air space may be defined between the pairs of magnetic field generating elements such that the pairs generate a magnetic field across the airspace therebetween.

The paramagnetic pump may further comprise a drive range to create a sequential or moving magnetic field. For example the individual magnetic fields may be pulsed. The magnetic field may be cyclical. By generating a sequential magnetic field a directional force may be created which is applied to the oxygen within the gas so as to provide a motive force to the oxygen in a desired direction.

In some embodiments the drive may comprise a mechanical arrangement. The mechanical arrangement may be configured from moving a series of magnets. For example, the mechanical arrangement may comprise a rotating plate or belt which carries a plurality of magnetic field generating elements (for example permanent magnets). The drive may comprise spaced apart drive members, each carrying at least one magnet paired with a corresponding magnet on the other drive member. Each of the spaced apart drive members may carry an array of magnets paired with corresponding magnets from an array on the other drive member. The drive may be arranged to move the pairs of magnets in parallel so as to generate a moving magnetic field across a spaced defined between the drive members.

The drive may comprise a controller for selectively switching a series of magnetic field generating elements. For example the drive controller may be arranged to pulse a series of magnetic field generating elements (for example electromagnets) in sequence so as to provide a directional motive force to oxygen within the gas. Whilst the controller may simply switch the magnetic fields on and off in the case of an electro magnet, alternatively the controller may provide an arrangement which temporarily interrupts an otherwise continuous magnetic field (for example from a permanent magnet).

The paramagnetic pump may define a gas conduit which compromises a first gas intake region across which the magnetic field is generated and a second oxygen discharge region, in which the magnetic field is absent. It will be appreciated that in the second region, the flow of oxygen may be governed by the momentum provided by the paramagnetic pump and/or an additional assisting force, such as a vacuum pump may be provided to completely remove oxygen. In the second region, the magnetic field may be blocked or disrupted. For example in a mechanical arrangement the second region may be provided with a magnetic field disruption device so as to ensure that oxygen can be drawn away from the pump. For example, the disruption arrangement may be a shielding arrangement to locally block or reduce the magnetic field provided by the paramagnetic pump.

In some embodiments the paramagnetic pump may be provided in an upper region of an aircraft fuel tank. The pump may be provided at an upper boundary of the fuel tank and may extend at least partially downwardly into the fuel tank ullage (i.e. the space above the fuel within the tank). The paramagnetic pump may be arranged to draw oxygen directly from the ullage. Accordingly, the paramagnetic pump may be arranged to vent oxygen or oxygen-rich gas from the fuel tank. It may be possible to simply exhaust the oxygen or oxygen-rich gas from the aircraft, or to use the oxygen or oxygen-rich gas for secondary purposes.

Depending upon the effectiveness of the particular system, (and factors such as the size of the fuel tank and the inerting requirements during a particular aircraft mission profile) the skilled person will appreciate that the system could be used as the sole means for drawing oxygen out of the fuel tank so as to provide an inert atmosphere or could be used in conjunction with another inerting system, so as to reduce the requirement for providing nitrogen enriched air to the fuel tank.

In other embodiments the paramagnetic pump could be arranged to direct oxygen or oxygen-rich air within a fuel inerting system (i.e. in a location away from the fuel tank but directly or indirectly in fluid communication with the tank via the inerting system). For example, the paramagnetic pump could be arranged within an inerting system so that it is exposed to continuous flow of gas. For example the paramagnetic pump could be exposed to gas being drawn from the ullage or vent system.

In some embodiments of the invention, the paramagnetic pump may be provided within an air separation unit of the inerting system. For example the paramagnetic pump may be provided with a source of air and may be utilised to separate oxygen enriched air and nitrogen enriched air for subsequent use in the inerting system.

According to a further aspect of the invention, there is provided an air separation module for an aircraft inerting system, the air separation module compromising an inlet for receiving a source of air, an outlet for exhausting nitrogen enriched air and a paramagnetic pump arranged between the inlet and outlet, wherein the paramagnetic pump is configured, in use, to apply a magnet field to gas passing through the air separation module, which provides a motive force to direct oxygen from the air towards a further outlet for exhausting oxygen enriched air.

The paramagnetic pump may receive air from aircraft cabin air. As such the inerting system or air separation module may further comprise arrangements for conditioning the air. For example filters may be provided for dust removal and/or biological waste. Dehumidification arrangements may be provided to reduce the moisture content of the air.

The air supply to the air separation module may be pressurized. Accordingly, the air separation module or inerting system may further comprise a compressor, for example a turbocharger, for compressing the air prior to the air being provided to the inlet of the air separation module.

The air separation module may further comprise at least one turbulence generator (for example at least one baffle) to increase the turbulence of air passing through the air separation module. By increasing the turbulence, the path length of the air travelling through the air separation module is increased, assisting in oxygen separation.

The inerting system or air separation module may further comprise a feedback control to vary the flow of air through the air separation module so as to control the production of nitrogen enriched air. For example the control may include an oxygen sensor with feedback control.

The skilled person will appreciate that whilst the air separation module, in accordance with embodiments of the invention, may provide an alternative to existing air separation modules; it may also be of benefit as an additional system. For example embodiments of the invention could be used to either reduce load on the existing inerting system or to allow increased efficiency of the inerting system during peak demand (for example during the descent phase of an aircraft operation).

According to a further aspect of the invention, there is provided an aircraft comprising at least one fuel tank and an inerting system in accordance with an embodiment of the invention.

Whilst this invention has been described above, it extends to any inventive combination or sub-combination of the features set out above, in the formal description or the claims or the drawings.

BRIEF DESCRIPTION OF THE DRAWINGS

By way of example only, embodiments of the invention will now be described in detail with reference to the accompanying drawings in which.

DETAILED DESCRIPTION

Figure 1:
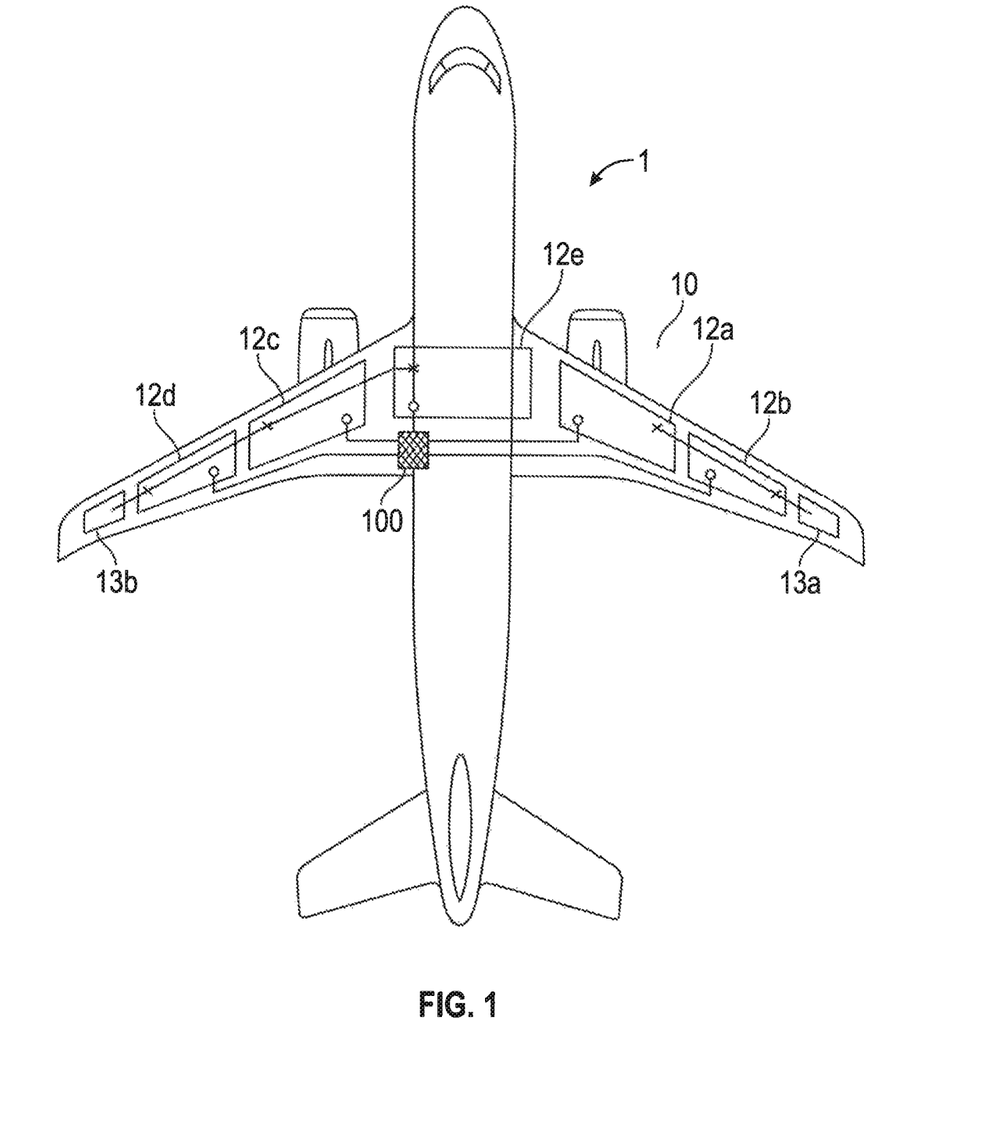
FIG. 1 is a schematic representation of an aircraft including a fuel system having a fuel inerting system.

A typical fixed wing aircraft 1 is illustrated schematically in FIG. 1. The aircraft includes a fuel system 10 having a plurality of fuel tanks 12. The tanks 12 are which are vented via vent tanks 13. The vent tanks allow air to be drawn into the fuel tank as the fuel is consumed and as a result of changes in the external atmospheric pressure (for example in ward venting during decent of the aircraft). An inerting system 100 is provided in fluid communication with the fuel tanks to reduce the flammability of the gas within the ullage space above the fuel.

Figure 2:
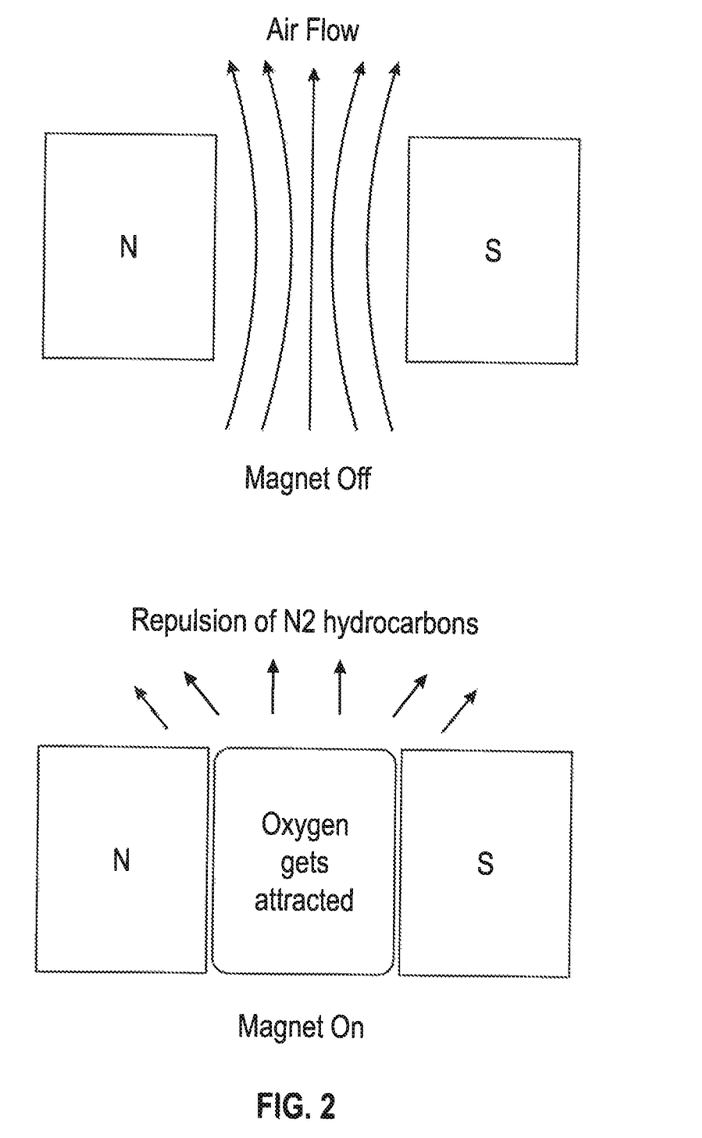
FIG. 2 is a schematic representation of the paramagnetic effect on a gas.

Embodiments of the invention are based upon the paramagnetic effect in which certain substances, including oxygen, are attracted towards higher magnetic fields strengths. This effect is illustrated schematically in FIG. 2 which shows how air may freely flow between magnetic field generating elements (represented by poles N and S) when the magnetic field is not present. However, when the magnetic field is present, oxygen is attracted to the magnetic field between the poles. Other substances which are repelled by stronger magnetic fields, such as nitrogen and hydrocarbons, are repelled from the air gap between the poles.

Figure 3:
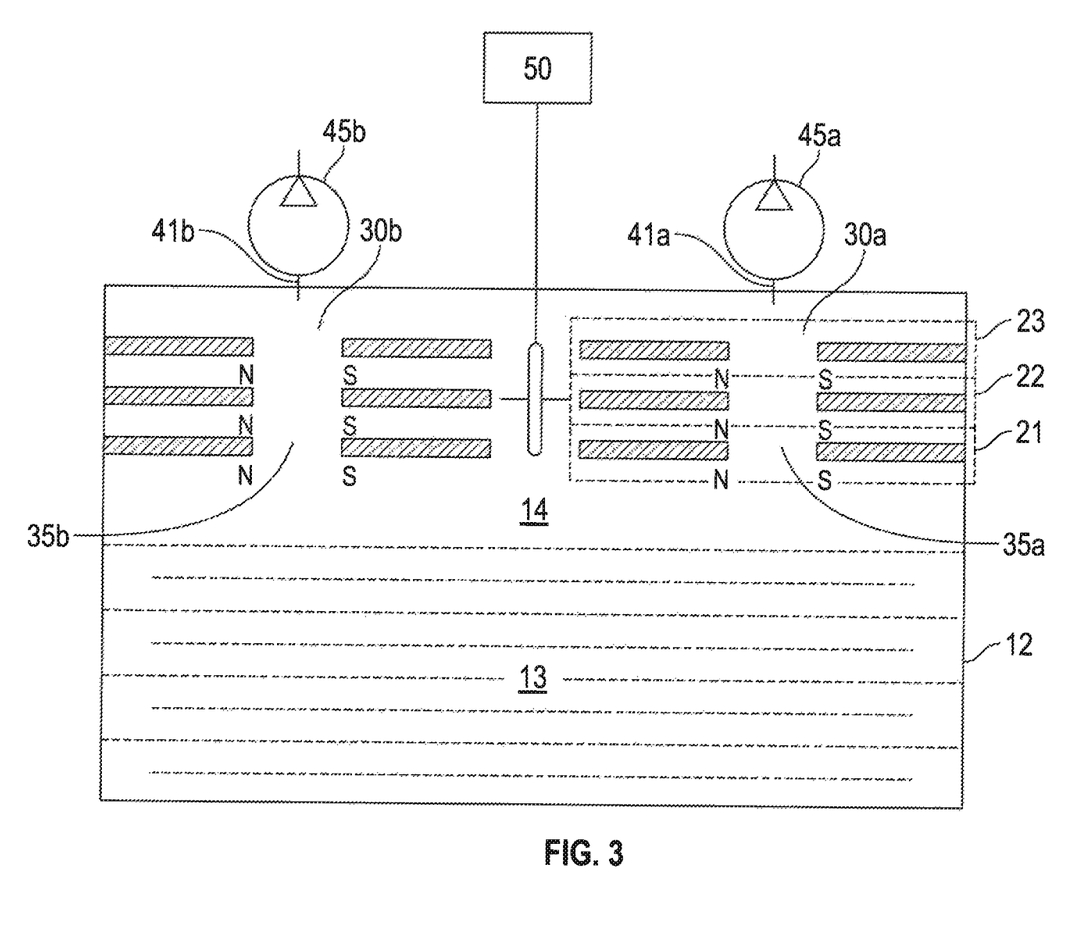
FIG. 3 is a schematic representation of a fuel tank incorporating an inerting system in accordance with the first embodiment of the invention.

The applicants have identified that this effect can provide a useful effect in a fuel tank inerting system. In accordance with a first embodiment, as shown in FIG. 3, a fuel tank 12 contains a fuel 13 and an ullage space 14 containing air. At least one outlet 41 (and in the illustrated embodiment a pair of outlets 41a and 41b) is provided as part of an inerting system. A skilled person will appreciate that the outlet may be provided with a float valve to ensure fuel cannot enter the outlet. A vacuum pump 45 may be provided upstream of the outlet 41. Proximal to the, or each, outlet 41 there is provided a paramagnetic pump arrangement 30. In the illustrated embodiment two substantially identical pumps 30a and 30b are provided each associated with a separate outlet 41a, 41b. The paramagnetic pump is arranged in the ullage 14 of the fuel tank 12.

The paramagnetic pump 30 according to this embodiment comprises a series of magnetic arrangements 21, 22 and 23 provided in the ullage 14. The magnetic arrangements are spaced apart in the vertical direction. Each magnetic arrangement 21, 22, 23 comprises a first and second opposing magnetic element arranged in a pair with an air gap 35 therebetween. The airgaps 35 are aligned to define a path through the paramagnetic pump 30. The air gaps 35 generally extend upwardly through the fuel tank ullage and are aligned with the outlet 41 at the upper surface of the fuel tank 12. The magnetic elements 21, 22 and 23 are electromagnetic elements which may be switched on and off and are controlled via a controller 50.

In use, the magnetic elements 21, 22 and 23 are activated in sequence. The lower most magnetic element 21 may be activated first to cause an initial draw of oxygen away from the ullage. Upon activation of the magnetic element surrounding oxygen is drawn into the space between the opposing pair of magnetic elements. Other gasses are able to be displaced into the surrounding space (and are provided with an escape path due to the spacing apart of the magnetic arrangement). Subsequently the second magnetic element 22 and then the third magnetic element 23 may be activated 23 in sequence. As each magnet is activated the previous magnet may be deactivated. Thus, a pocket of oxygen (or oxygen enriched gas) initially attracted by the first element 21 may be moved up to the second element 22 and then the third magnetic element 23. In this manner the paramagnetic pump 30 is able to provide a pulsed motive force to oxygen within the gas of the ullage 14 so as to direct it in an upward direction away from the fuel 13 and towards the outlet 41, whilst also repelling nitrogen and hydrocarbon. Once oxygen reaches the outlet the vacuum pump 45 may assist its complete withdrawal from the fuel tank 12. Once the uppermost magnetic element 23 has been switched off, the lower most magnetic element 21 will be switched back on so as to repeat the sequential activation of the magnets.

It will be appreciated that whilst the magnetic elements 21, 22, 23 the paramagnetic pump 30 may in effect provide a series of pulses to the oxygen in the gas in practice they will be operated as a continuous sequence. Thus, the paramagnetic pump 30 may effectively provide a quasi-continuous motive effect on oxygen within the fuel tank to direct it towards the outlet 41.

Whilst the illustrated embodiment includes a second paramagnetic pump 30b associated with a separate outlet 41b at a second location of the fuel tank 12, it will be appreciated that any appropriate number of pump and outlet arrangements may be provided. For example the arrangement may be selected depending upon the required maximum oxygen removal rate required from the tank 12. It will also be appreciated that it is not essential to have a direct one-to-one relationship between the outlets and pumps. A skilled person will appreciate that the maximum removal rate must generally be determined based upon a descent phase of the aircraft operation.

Figure 4:
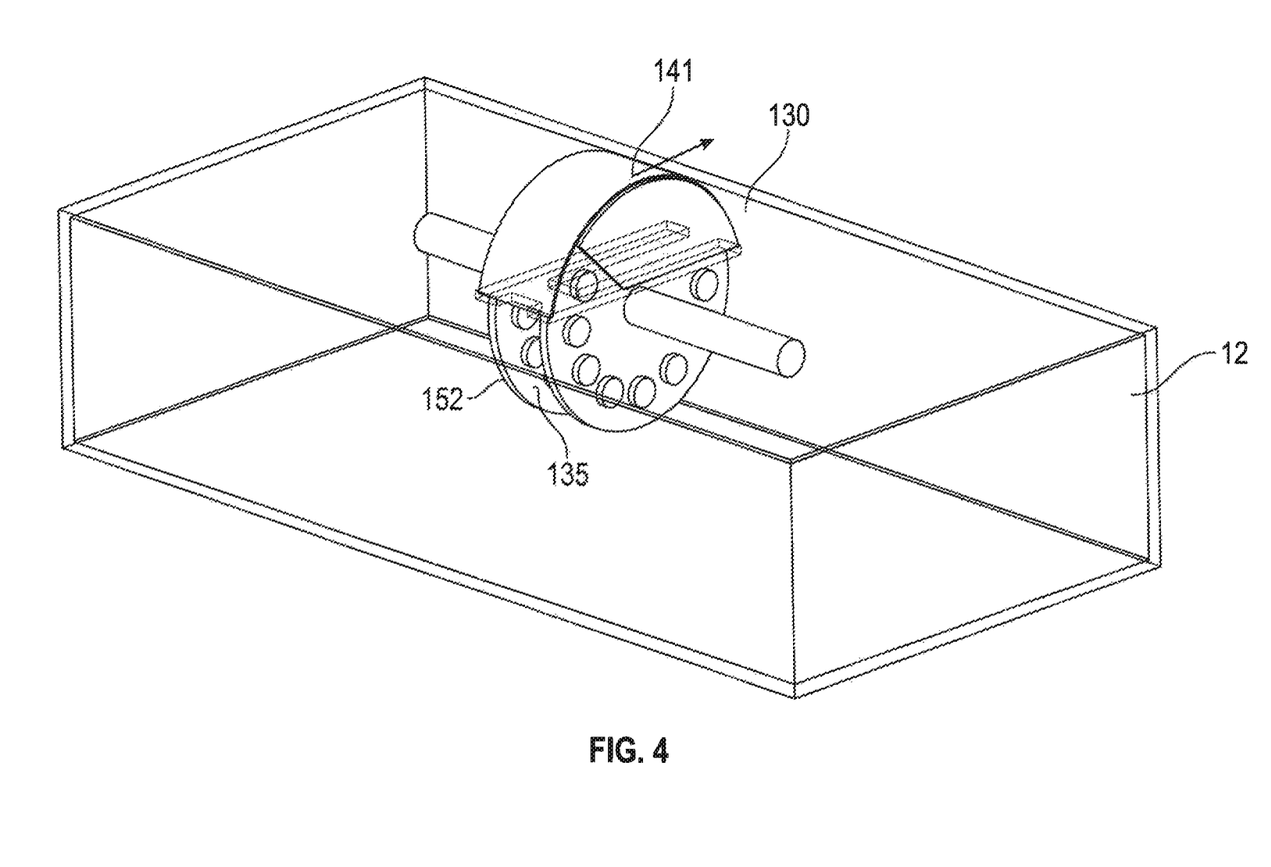
FIG. 4 is a schematic representation of an alternative embodiment of the invention.

An alternative embodiment of the invention is shown in FIG. 4, which shows an external schematic perspective of a fuel tank with the fuel tank boundary represented partially transparently for clarity. This embodiment operates based on the same general principle as the embodiment of FIG. 3 using a paramagnetic pump 130 disposed in an upper region of the fuel tank 12. However, in this embodiment the paramagnetic pump 130 on has a mechanical arrangement. The mechanical arrangement utilises movement of a series of permanent magnets 120 rather than the switching of the magnets as in the embodiment of FIG. 3. The mechanical arrangement is shown in further detail in FIG. 5a, and an alternative mechanical arrangement is shown in FIG. 5b.

Figure 5A:
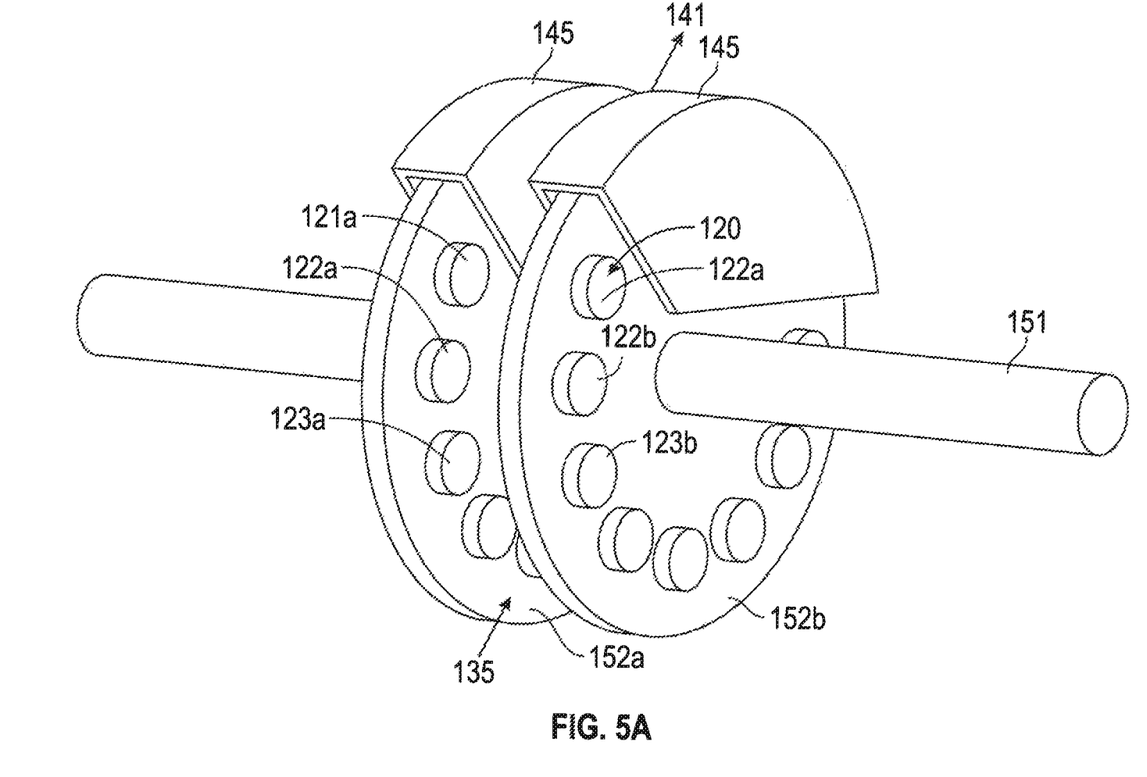
FIGS. 5a and 5b schematically illustrates paramagnetic pumps for use in embodiments of the invention.
Figure 5B:
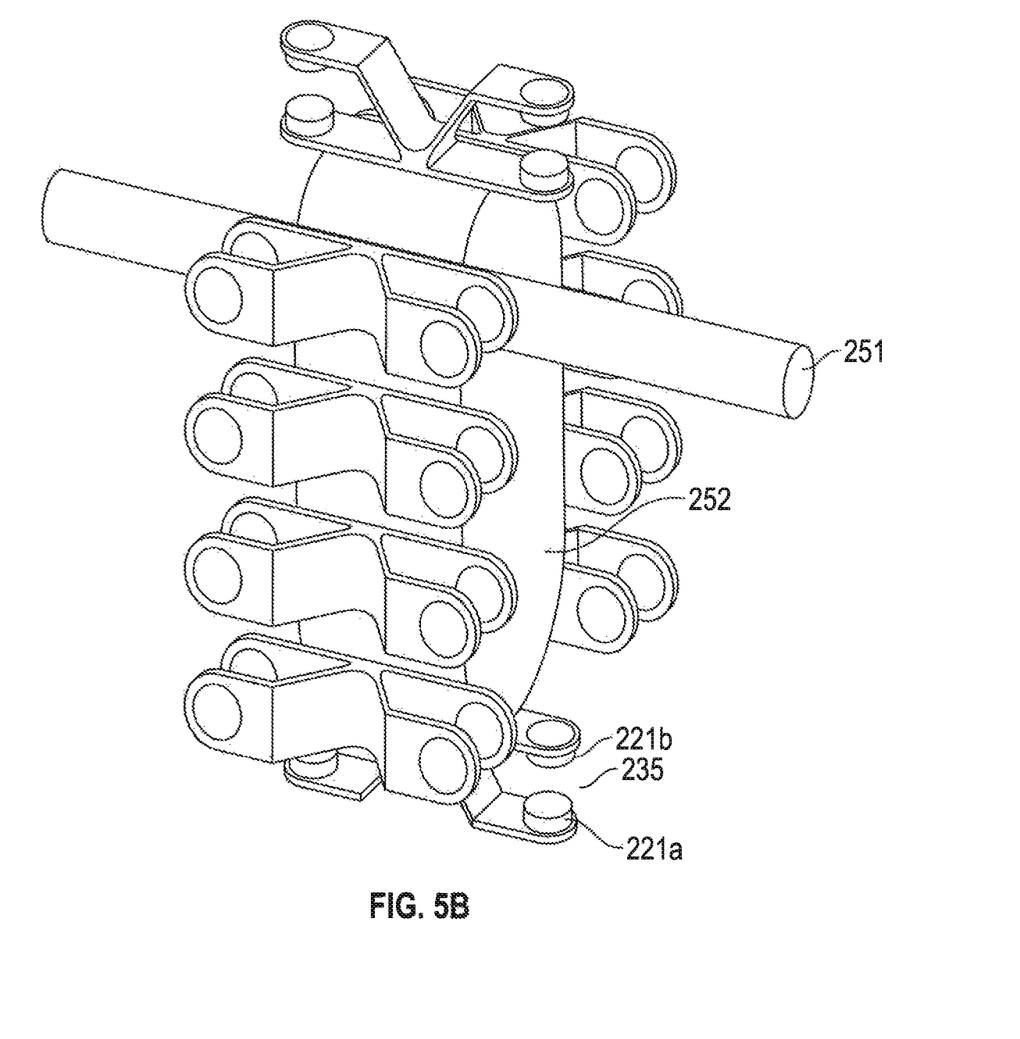

In the embodiment of FIGS. 4 and 5a the paramagnetic pump arrangement 130 is mounted in a position such that it extends substantially into the fuel tank ullage 14 but has an upper region 131 which is located in a recess extending upwardly from the upper fuel tank boundary wall. This upper region 131 provides a discharged area for oxygen and will generally be associated with an outlet 141 (shown schematically). The pump 130 of this embodiment utilises a pair of rotating discs 152a and 152b which are mounted to a common drive shaft 151. The drive shaft 151 may for example be driven by any convenient means such as a DC motor. Depending upon the required oxygen concentration, the number of discs 152 could be varied and as such an advantage of this arrangement is that it is easily scalable. As the discs are coaxial and the magnetic field is axially aligned across the space between adjacent discs it will be appreciated that the arrangement is compact and convenient. Whilst a plurality of discs is advantageous since a magnetic field can be formed extending across the gap 135 between adjacent discs 152a 152b, some embodiments may even comprise only a single disc.

Magnetic element 121, 122, 123 etc. may be arranged in a circumferential array around an outer portion of the disc 152. Each magnetic element is associated with a paired magnetic element on the adjacent disc, having an opposite pole such that a magnetic field is created in the space 135 between the discs. The discs are formed of a non magnetic material so as to ensure that a spacing is provided between the magnetic fields generated by each magnetic element. This spacing allows for the escape of nitrogen and/or hydrocarbons from the gas.

In use, the shaft 151 is rotated such that the array of magnets on discs 152 provide a rotating magnetic field across the air gap 130. This rotation serves to provide a motive force upon oxygen attracted between the magnets. Other gases such as nitrogen and hydrocarbons are repelled by the magnetic field away from the rotating magnetic field so are not provided with the same directional rotational motive force. Proximal to the outlet 141, a magnetic shield arrangement 145 is provided which acts to break the magnet field ("short circuiting" the magnetic path) between the opposed magnetic elements 120 of the discs 152 to enable release of the oxygen. A vacuum pump (not shown) or the like may be provided to extract the released oxygen near the outlet 141.

During use, the rotation of the disc may create a continuous extraction pump effect on the oxygen between the discs of the pump 120 and therefore provide a motive force to encourage oxygen to be moved out of the tank via the outlet 141 (which may be assisted by a vacuum pump at the outlet). It will be appreciated that this embodiment provides several design variables which can be used to adjust the oxygen extraction, for example the spacing or number of magnetic elements 120 on the disc 152, the number of discs 152, the strength of the magnetic field generated and the speed of rotation of the shaft 151. Advantageously once a system has been initially sized, the speed of rotation of the shaft 151 may provide a convenient variable to enable the oxygen removal rate to be adjusted during use.

A further embodiment of the invention is shown in FIG. 5b in which the disc arrangement has been replaced by a belt 250 which carries a series of spaced apart magnetic elements 221. The elements define an airgap 235 between for capturing oxygen and are spaced apart around the belt to allow escape of other gases (in much the same manner as the embodiment of FIG. 5a).

It will be appreciated that an advantage of a belt based system may be provision of greater flexibility in the mounting/geometry of the pump depending upon the available spatial requirements. In the illustrated embodiment, two separate arrays of paired magnetic elements are provided on a single belt via a mounting arrangement. However it will be appreciated that this arrangement may be easily varied, depending on the system requirements. As with the disc arrangement, an arrangement will be provided to disrupt the magnetic field generated by the magnetic elements at outlet location so that oxygen may be released to the outlet.

Figure 6:
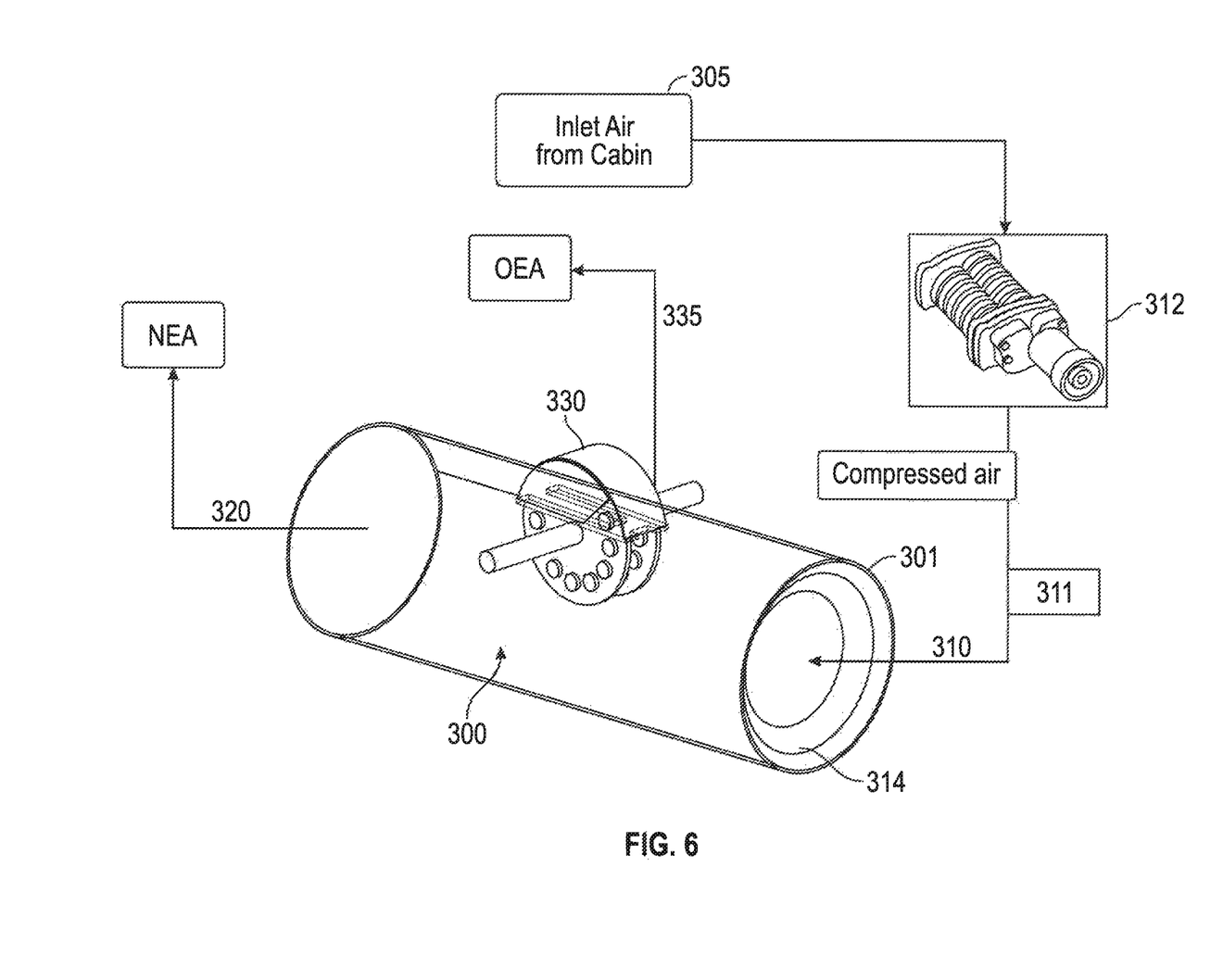
FIG. 6 illustrates an air separation module in accordance with the embodiments of the invention.

FIG. 6 illustrates an alternative arrangement in which the paramagnetic pump according to embodiments of the invention is utilised in an air separation module 300. The air separation module 300 could for example be used in an otherwise conventional inerting system, in place of other air separation module technologies. Alternatively, could be used to supplement such an existing system, for example by being used to reduce the load on the compressor and vacuum pump on an aircraft inerting system. It will also be appreciated that the air separation module 300 could also be used in conjunction with other embodiments of the invention.

The air separation module 300 comprises a conduit having an inlet 310 for receiving a supply of air. The air supply is preferably supplied under pressure and may for example be supplied via a compressor 312. The paramagnetic air separation module 300 includes a paramagnetic pump 330 which may be of a similar configuration to any of the preceding embodiments. However, in the illustrated embodiment the paramagnetic pump 330 comprises a disc based arrangement which is essentially identical to that used in the embodiments of FIGS. 4 and 5a.

Air entering the body of the air separation module 300 via inlet 310 may be preconditioned by at least one air conditioning module 311 such as a dehumidifier or a dust filter (particularly if the source is cabin air). After entering the air separation module the air may travel over at least one turbulence generating baffle 314 which increases the path length of the air travelling through the air separation module 300. The paramagnetic pump 330 operates in substantially the same manner as the previous embodiments and selectively directs oxygen from the flow of the air separation module 300 towards an outlet 335. Thus, outlet 335 provides oxygen enriched air. The remaining flow of pressurized air through the air separation module 300 continues to travel beyond the paramagnetic pump 330 to an outlet 320 for nitrogen enriched air. It will be appreciated that the nitrogen enriched air may then be directed to a fuel tank for inerting purposes, with the oxygen enriched air either vented or utilised for other purposes on the aircraft.

Although the invention has been instructed above with reference to its preferred embodiments, it will be appreciated that various changes and modifications may be made without departing from the scope of the invention as defined in the appended claims.

For example, an advantage of embodiments of the invention is that the performance of the paramagnetic pump may be easily varied by controlling the speed of movement of the magnetic field. Accordingly, in any of the above embodiments an oxygen sensor may be provided to provide feedback control which can be used to vary the speed of operation to provide additional oxygen separation when required (for example during the descent phase of the aircraft).

Whilst the embodiment described above utilises cabin air as a source the skilled person will appreciated that other sources may be used. For example, bleed air or ram air may be used as an alternative.

It may also be appreciated that embodiments of the invention may be needed in conjunction or combination with other fuel inerting systems. For example a paramagnetic pump in accordance with the invention could be used in series with a hollow fibre separator so as to provide a higher purity of NEA.

Embodiments of the invention using permanent magnets may benefit from a low maintenance cost. It is believed that embodiments of the invention may enable savings in costs, weight and/or energy efficiency. For example the operating cost in comparison to existing inerting systems (particularly permeable membrane air separation units) may be reduced due to lower pressure drops and minimal requirements for thermal management. Only limited electronic components may be required in many embodiments (for example possibly only drives for electric motors) which has inherent safety advantages for aircraft fuel systems. Furthermore, existing air separation modules which utilise permeable membrane technology are generally relatively bulky so embodiments of the invention may provide opportunities for weight and/or volume reduction of the inerting system.

A further advantage of embodiments of the invention is that they may provide an inerting system which is classed as low temperature and/or low pressure. The provision of a low temperature and low pressure Air Separation Module is desirable and can overcome limitations of prior art hollow fibre membrane based Air Separation Modules.

The invention claimed is:

1. An aircraft fuel tank inerting system, comprising: a paramagnetic pump directly or indirectly in fluid communication with a ullage of an aircraft fuel tank, the paramagnetic pump being arranged to apply a magnetic field to gas from the ullage so as to provide a motive force for drawing oxygen from said gas, wherein the paramagnetic pump comprises a series of magnetic field generators configured to provide a sequence of discrete spaced apart magnetic fields, and wherein the series of magnetic field generators comprises a series of spaced apart pairs of magnetic field generators, each spaced apart pair of magnetic field generators with an air gap between the pair and arranged to generate a respective spaced apart magnetic field, of the sequence of discrete spaced apart magnetic fields, across an airspace therebetween, the air gap aligned with an outlet at an upper surface of the fuel tank, oxygen being drawn into the air gap upon activation of each pair of magnetic field generators.

2. The aircraft fuel tank inerting system as claimed in claim 1, wherein the paramagnetic pump further comprises a drive configured to generate a sequential magnetic field.

3. The aircraft fuel tank inerting system as claimed in claim 2, wherein the drive comprises a mechanical arrangement for moving the series of magnetic field generators.

4. The aircraft fuel tank inerting system as claimed in claim 2, wherein the drive comprises a pair of spaced apart drive members each carrying at least one magnet paired with a corresponding magnet on the other drive member.

5. The aircraft fuel tank inerting system as claimed in claim 2, wherein the drive comprises a controller for selectively switching the series of magnetic field generators.

6. The aircraft fuel tank inerting system as claimed in claim 1, wherein the paramagnetic pump defines a gas conduit, the gas conduit comprising a first, gas intake, region across which the magnetic field is generated and a second, oxygen discharge, region in which the magnetic field is absent.

7. The aircraft fuel tank inerting system as claimed in claim 1, wherein the paramagnetic pump is provided in an upper region of the aircraft fuel tank.

8. The aircraft fuel tank inerting system as claimed in claim 1, wherein the paramagnetic pump is arranged to vent oxygen or oxygen-rich-gas from the aircraft fuel tank.

9. The aircraft fuel tank inerting system as claimed in claim 1, wherein the paramagnetic pump is arranged to direct oxygen or oxygen-rich-gas from a fuel inerting system.

10. An aircraft air separation module for use in an aircraft inerting system, the air separation module comprising: an inlet for receiving a source of air, an outlet for exhausting nitrogen enriched air, and a paramagnetic pump arranged between the inlet and outlet, wherein the paramagnetic pump is configured to apply a magnetic field to gas passing through the air separation module which provides a motive force to direct oxygen from the air towards a further outlet for exhausting oxygen enriched air, wherein the paramagnetic pump comprises a series of magnetic field generators configured to provide a sequence of discrete spaced apart magnetic fields, and wherein the series of magnetic field generators comprises a series of spaced apart pairs of magnetic field generators, each spaced apart pair of magnetic field generators with an air gap between the pair and arranged to generate a respective spaced apart magnetic field, of the sequence of discrete spaced apart magnetic fields, across an airspace therebetween, the air gap aligned with an outlet at an upper surface of a fuel tank, oxygen being drawn into the air gap upon activation of each pair of magnetic field generators.

11. The aircraft air separation module as claimed in claim 10, wherein the paramagnetic pump receives air from a cabin of the aircraft.

12. The aircraft air separation module as claimed in claim 10, wherein the air separation module further comprises at least one turbulence generator to increase a turbulence of the air passing through the air separation module.

13. The aircraft air separation module as claimed in claim 10, further comprising a feedback control to vary the flow of air through the air separation module to control production of nitrogen enriched air.

14. An aircraft comprising at least one fuel tank and the aircraft fuel tank inerting system of claim 1.

15. The aircraft fuel tank inerting system as claimed in claim 5, wherein the controller is configured to activate each of the spaced apart pairs of magnetic field generators in sequence, wherein, as each pair of magnetic field generators is activated, the previous pair of magnetic field generators is switched off, to provide a pulsed motive force to the oxygen to direct the oxygen toward the outlet.

* * * * *